United States Patent
Chadha et al.

(10) Patent No.: US 10,175,985 B2
(45) Date of Patent: Jan. 8, 2019

(54) MECHANISM FOR USING A RESERVATION STATION AS A SCRATCH REGISTER

(71) Applicant: International Business Machines Corporation, Armonk, NY (US)

(72) Inventors: Sundeep Chadha, Austin, TX (US); Michael J. Genden, Austin, TX (US); Dung Q. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 15/082,264

(22) Filed: Mar. 28, 2016

(65) Prior Publication Data

US 2017/0277541 A1 Sep. 28, 2017

(51) Int. Cl.
*G06F 9/30* (2018.01)
*G06F 9/38* (2018.01)

(52) U.S. Cl.
CPC ...... *G06F 9/30101* (2013.01); *G06F 9/30094* (2013.01); *G06F 9/3863* (2013.01)

(58) Field of Classification Search
None
See application file for complete search history.

(56) References Cited

U.S. PATENT DOCUMENTS

| | | | |
|---|---|---|---|
| 5,860,014 A * | 1/1999 | Cheong | G06F 9/3861 710/260 |
| 6,016,541 A | 1/2000 | Tashima et al. | |
| 6,122,721 A | 9/2000 | Goddard et al. | |
| 6,629,233 B1 * | 9/2003 | Kahle | G06F 9/3013 712/217 |
| 6,651,163 B1 | 11/2003 | Kranich et al. | |
| 8,533,437 B2 | 9/2013 | Henry et al. | |
| 2002/0073357 A1 * | 6/2002 | Dhong | G06F 9/3861 714/19 |

(Continued)

FOREIGN PATENT DOCUMENTS

EP 2159686 3/2010

OTHER PUBLICATIONS

T. Austin et al. "Efficient Dynamic Scheduling Through Tag Elimination". 29th Annual International Symposium on Computer Architecture, 2002 Proceedings. IEEE, vol. 30, Issue 2, p. 37-46.

*Primary Examiner* — George Giroux
(74) *Attorney, Agent, or Firm* — Law Office of Jim Boice

(57) ABSTRACT

A processor core includes an instruction-sequencing unit (ISU). The ISU includes a general register file (GRF) composed of multiple hardware general purpose registers (GPRs), an exception register (XER), and a reservation station (RS). The execution unit(s) load an address of data in a data GPR, and load a first portion of the data in a first data GPR and a second portion of the data in a second data GPR in the GRF, where loading the portions of the data generate intermediate data condition codes that are loaded in the XER. The execution unit(s) generate a cumulative data condition code, which is loaded into a history buffer within the ISU. The intermediate data condition codes are loaded into a reservation station (RS) within the ISU. Upon flushing the GRF and the XER, the ISU repopulates the GRF from a history buffer and the XER from the RS.

20 Claims, 4 Drawing Sheets

(56) References Cited

U.S. PATENT DOCUMENTS

| | | | |
|---|---|---|---|
| 2006/0271820 A1* | 11/2006 | Mack | G06F 11/1407 714/17 |
| 2008/0263331 A1* | 10/2008 | Le | G06F 9/384 712/217 |
| 2008/0270506 A1* | 10/2008 | Lundvall | G06F 7/38 708/495 |
| 2009/0164763 A1* | 6/2009 | Sperber | G06F 9/30036 712/225 |
| 2009/0327657 A1 | 12/2009 | Sperber et al. | |
| 2016/0070574 A1* | 3/2016 | Boersma | G06F 9/3887 712/214 |
| 2017/0315528 A1* | 11/2017 | Barrick | G05B 19/0426 |

* cited by examiner

MECHANISM FOR USING A RESERVATION STATION AS A SCRATCH REGISTER

BACKGROUND

The present disclosure relates to the field of processors, and more specifically to the field of processor cores. Still more specifically, the present disclosure relates to the use of a reservation station within a processor core as a scratch register.

SUMMARY

In an embodiment of the present invention, a method and/or computer program product utilize a reservation station to repopulate a flushed exception register. One or more execution units within a processor core retrieve an address of data. The address of the data is loaded into a data address general purpose register (GPR) in a general register file (GRF). The GRF is in an instruction sequencing unit (ISU) in the processor core, and the data that is retrieved is larger than a storage capacity of any single GPR in the GRF. One or more execution units within the processor core store a first portion of the data in a first data GPR in the GRF, where storing the first portion of the data in the first data GPR generates a first intermediate data condition code that is loaded into an exception register (XER) in the ISU. One or more execution units within the processor core store a second portion of the data in a second data GPR in the GRF, where storing the second portion of the data in the second data GPR generates a second intermediate data condition code that is loaded into the XER in the ISU. One or more execution units within the processor core generate a cumulative data condition code based on the first intermediate data condition code and the second intermediate data condition code. The ISU stores, via a mapper within the ISU, the cumulative data condition code in a cumulative data condition code register, where the cumulative data condition code register is in a history buffer (HB) within the ISU. The ISU stores the first intermediate data condition code and the second intermediate data condition code in a reservation station (RS) within the ISU, where the RS is a hardware instruction sequence queue used by the processor core to dispatch data to various execution units within the processor core. The ISU flushes the GRF and the XER, and then repopulates the GRF with information from the HB and the XER with the first intermediate data condition code and the second intermediate data condition code from the RS.

In an embodiment of the present invention, a processor core comprises one or more hardware execution units and an instruction sequencing unit (ISU). The ISU comprises a general register file (GRF) composed of multiple hardware general purpose registers (GPRs), an exception register (XER), and a reservation station (RS), where the RS is an instruction sequence hardware queue used by the processor core to dispatch data to various execution units within the processor core. The one or more execution units within a processor core retrieve an address of data, where the address of the data is loaded into a data address general purpose register (GPR) in a general register file (GRF), where the GRF is in an instruction sequencing unit (ISU) in the processor core, and where the data is larger than a storage capacity of GPRs in the GRF. The one or more execution units within the processor core store a first portion of the data in a first data GPR in the GRF, where storing the first portion of the data in the first data GPR generates a first intermediate data condition code that is loaded into an exception register (XER) in the ISU. The one or more execution units within the processor core store a second portion of the data in a second data GPR in the GRF, where storing the second portion of the data in the second data GPR generates a second intermediate data condition code that is loaded into the XER in the ISU. The one or more execution units within the processor core generate a cumulative data condition code based on the first intermediate data condition code and the second intermediate data condition code. A mapper within the ISU stores the cumulative data condition code in a cumulative data condition code register, where the cumulative data condition code register is in a history buffer (HB) within the ISU. The ISU stores the first intermediate data condition code and the second intermediate data condition code in a reservation station (RS) within the ISU. The ISU flushes the GRF and the XER. The ISU repopulates the GRF with information from the HB. The ISU repopulates the XER with the first intermediate data condition code and the second intermediate data condition code from the RS.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
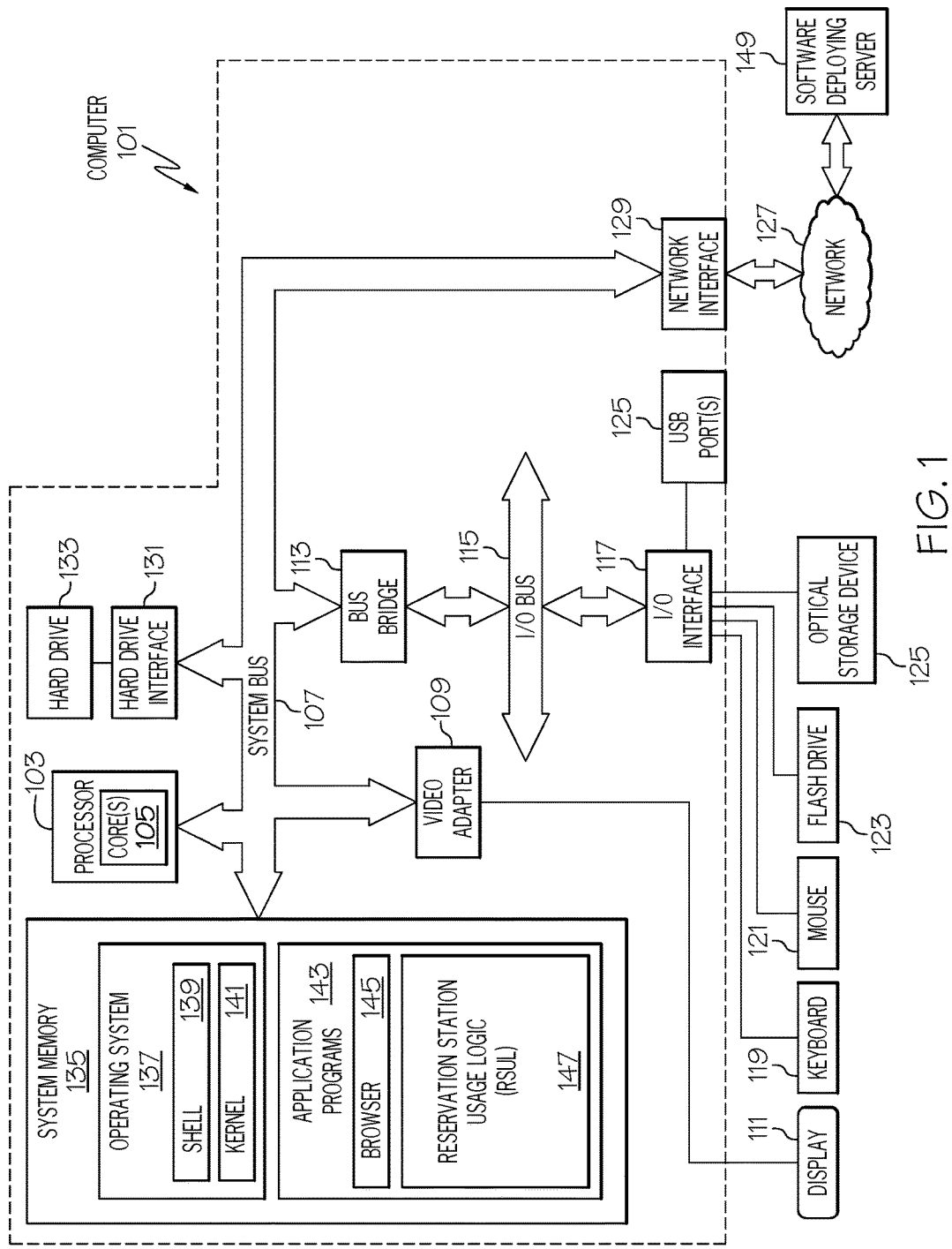
FIG. 1 depicts an exemplary computer system and/or network which may be utilized by the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and particularly to FIG. 1, there is depicted a block diagram of an exemplary computer 101, within which the present invention may be utilized. Note that some or all of the exemplary architecture shown for computer 101 may be utilized by software deploying server 149 shown in FIG. 1.

Computer 101 includes a processor 103, which may utilize one or more processors each having one or more processor cores 105. Processor 103 is coupled to a system bus 107. A video adapter 109, which drives/supports a display 111, is also coupled to system bus 107. System bus 107 is coupled via a bus bridge 113 to an Input/Output (I/O) bus 115. An I/O interface 117 is coupled to I/O bus 115. I/O interface 117 affords communication with various I/O devices, including a keyboard 119, a mouse 121, a Flash Drive 123, and an optical storage device 125 (e.g., a CD or DVD drive). The format of the ports connected to I/O interface 117 may be any known to those skilled in the art of computer architecture, including but not limited to Universal Serial Bus (USB) ports.

Computer 101 is able to communicate with a software deploying server 149 and other devices via network 127 using a network interface 129, which is coupled to system bus 107. Network 127 may be an external network such as the Internet, or an internal network such as an Ethernet or a Virtual Private Network (VPN). Network 127 may be a wired or wireless network, including but not limited to cellular networks, Wi-Fi networks, hardwired networks, etc.

A hard drive interface 131 is also coupled to system bus 107. Hard drive interface 131 interfaces with a hard drive 133. In a preferred embodiment, hard drive 133 populates a system memory 135, which is also coupled to system bus 107. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. Note that while shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a World Wide Web (WWW) client (i.e., computer 101) to send and receive network messages to the Internet using HyperText Transfer Protocol (HTTP) messaging, thus enabling communication with software deploying server 149 and other described computer systems.

Application programs 143 in computer 101's system memory (as well as software deploying server 149's system memory) also include a Reservation Station Usage Logic (RSUL) 147. RSUL 147 includes code for implementing the processes described below in FIGS. 2-3. In one embodiment, computer 101 is able to download RSUL 147 from software deploying server 149, including in an on-demand basis.

The hardware elements depicted in computer 101 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
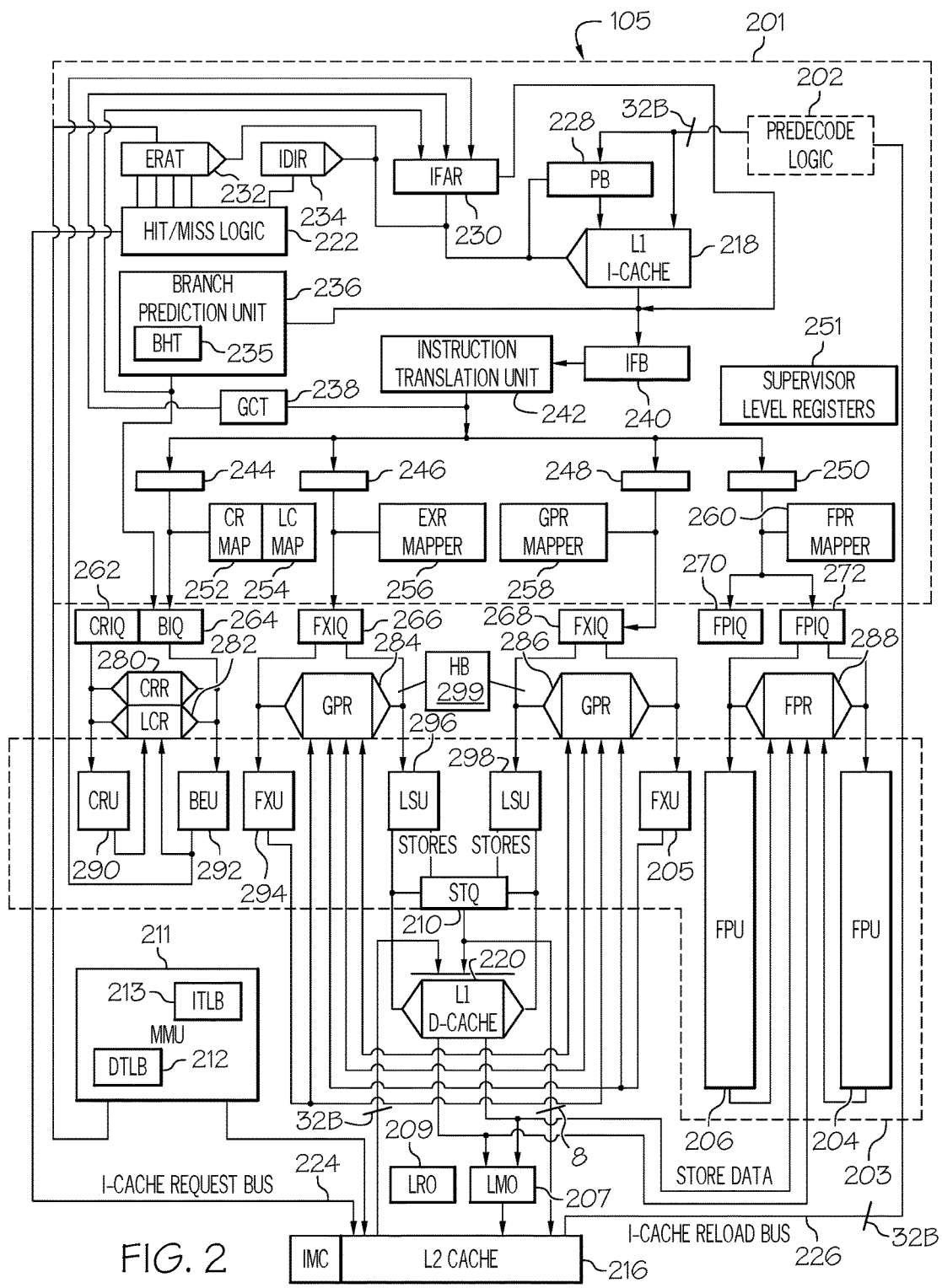
FIG. 2 illustrates additional exemplary detail of a processor core depicted in FIG. 1.

With reference now to FIG. 2, additional exemplary detail of core 105 depicted in FIG. 1 is presented. Core 105 includes an on-chip multi-level cache hierarchy including a unified level two (L2) cache 216 and bifurcated level one (L1) instruction (I) and data (D) caches 218 and 220, respectively. As is well-known to those skilled in the art, caches 216, 218 and 220 provide low latency access to cache lines corresponding to memory locations in system memories (e.g., system memory 135 shown in FIG. 1).

Instructions are fetched for processing from L1 I-cache 218 in response to the effective address (EA) residing in instruction fetch address register (IFAR) 230. During each cycle, a new instruction fetch address may be loaded into IFAR 230 from one of three sources: branch prediction unit (BPU) 236, which provides speculative target path and sequential addresses resulting from the prediction of conditional branch instructions, global completion table (GCT) 238, which provides flush and interrupt addresses, and branch execution unit (BEU) 292, which provides non-speculative addresses resulting from the resolution of predicted conditional branch instructions. Associated with BPU 236 is a branch history table (BHT) 235, in which are recorded the resolutions of conditional branch instructions to aid in the prediction of future branch instructions.

An effective address (EA), such as the instruction fetch address within IFAR 230, is the address of data or an instruction generated by a processor. The EA specifies a segment register and offset information within the segment. To access data (including instructions) in memory, the EA is converted to a real address (RA), through one or more levels of translation, associated with the physical location where the data or instructions are stored.

Within core 105, effective-to-real address translation is performed by memory management units (MMUs) and associated address translation facilities. Preferably, a separate MMU is provided for instruction accesses and data accesses. In FIG. 2, a single MMU 211 is illustrated, for purposes of clarity, showing connections only to Instruction Store Unit (ISU) 201. However, it is understood by those skilled in the art that MMU 211 also preferably includes connections (not shown) to load/store units (LSUs) 296 and 298 and other components necessary for managing memory accesses. MMU 211 includes Data Translation Lookaside Buffer (DTLB) 212 and Instruction Translation Lookaside Buffer (ITLB) 213. Each TLB contains recently referenced page table entries, which are accessed to translate EAs to RAs for data (DTLB 212) or instructions (ITLB 213). Recently referenced EA-to-RA translations from ITLB 213 are cached in EOP effective-to-real address table (ERAT) 232.

If hit/miss logic 222 determines, after translation of the EA contained in IFAR 230 by ERAT 232 and lookup of the real address (RA) in I-cache directory 234, that the cache line of instructions corresponding to the EA in IFAR 230 does not reside in L1 I-cache 218, then hit/miss logic 222 provides the RA to L2 cache 216 as a request address via I-cache request bus 224. Such request addresses may also be generated by prefetch logic within L2 cache 216 based upon recent access patterns. In response to a request address, L2 cache 216 outputs a cache line of instructions, which are loaded into prefetch buffer (PB) 228 and L1 I-cache 218 via I-cache reload bus 226, possibly after passing through optional predecode logic 202.

Once the cache line specified by the EA in IFAR 230 resides in L1 I-cache 218, L1 I-cache 218 outputs the cache line to both branch prediction unit (BPU) 236 and to instruction fetch buffer (IFB) 240. BPU 236 scans the cache line of instructions for branch instructions and predicts the outcome of conditional branch instructions, if any. Following a branch prediction, BPU 236 furnishes a speculative instruction fetch address to IFAR 230, as discussed above, and passes the prediction to branch instruction queue (BIQ) 264 so that the accuracy of the prediction can be determined when the conditional branch instruction is subsequently resolved by branch execution unit 292.

IFB 240 temporarily buffers the cache line of instructions received from L1 I-cache 218 until the cache line of instructions can be translated by instruction translation unit (ITU) 242. In the illustrated embodiment of core 105, ITU 242 translates instructions from user instruction set architecture (UISA) instructions into a possibly different number of internal ISA (IISA) instructions that are directly executable by the execution units of core 105. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 238 to an instruction group, the members of which are permitted to be dispatched and executed out-of-order with respect to one another. Global completion table 238 tracks each instruction group for which execution has yet to be completed by at least one associated EA, which is preferably the EA of the oldest instruction in the instruction group.

Following UISA-to-IISA instruction translation, instructions are dispatched to one of latches 244, 246, 248 and 250, possibly out-of-order, based upon instruction type. That is, branch instructions and other condition register (CR) modifying instructions are dispatched to latch 244, fixed-point and load-store instructions are dispatched to either of latches 246 and 248, and floating-point instructions are dispatched to latch 250. Each instruction requiring a rename register for temporarily storing execution results is then assigned one or more rename registers by the appropriate one of CR mapper 252, link and count (LC) register mapper 254, exception register (XER) mapper 256, general-purpose register (GPR) mapper 258, and floating-point register (FPR) mapper 260.

The dispatched instructions are then temporarily placed in an appropriate one of CR issue queue (CRIQ) 262, branch issue queue (BIQ) 264, fixed-point issue queues (FXIQs) 266 and 268, and floating-point issue queues (FPIQs) 270 and 272. From issue queues 262, 264, 266, 268, 270 and 272, instructions can be issued opportunistically to the execution units of processor 103 (shown in FIG. 1) for execution as long as data dependencies and antidependencies are observed. The instructions, however, are maintained in issue queues 262-272 until execution of the instructions is complete and the result data, if any, are written back, in case any of the instructions need to be reissued.

As illustrated, the execution units of core 105 include an execution subcomponent 203, which includes a CR unit (CRU) 290 for executing CR-modifying instructions, a branch execution unit (BEU) 292 for executing branch instructions, two fixed-point units (FXUs) 294 and 205 for executing fixed-point instructions, two load-store units (LSUs) 296 and 298 for executing load and store instructions, and two floating-point units (FPUs) 206 and 204 for executing floating-point instructions. Each of execution units 290-294 and 204-206 is preferably implemented as an execution pipeline having a number of pipeline stages.

During execution within one of execution units 290-294 and 204-206, an instruction receives operands, if any, from one or more architected and/or rename registers within a register file coupled to the execution unit. When executing CR-modifying or CR-dependent instructions, CRU 290 and BEU 292 access the CR register file 280, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) file 282 contains a count register (CTR), a link register (LR) and rename registers of each, by which BEU 292 may also resolve conditional branches to obtain a path address. General-purpose register files (GPRs) 284 and 286, which are synchronized, duplicate register files, and store fixed-point and integer values accessed and produced by FXUs 294 and 205 and LSUs 296 and 298. Note that floating-point register file (FPR) 288, which like GPRs 284 and 286 may also be implemented as duplicate sets of synchronized registers, contains floating-point values that result from the execution of floating-point instructions by FPUs 206 and 204 and floating-point load instructions by LSUs 296 and 298.

Coupled to GPR 284 and/or GPR 286 is a history buffer (HB) 299, which contains historical data that was once held by GPR 284 and/or GPR 286. That is, GPR 284 and/or GPR 286 hold current (newer data), while HB 299 contains older data that used to be, but no long is, stored within GPR 284 and/or GPR 286.

After an execution unit finishes execution of an instruction, the execution unit notifies GCT 238, which schedules completion of instructions in program order. To complete an instruction executed by one of CRU 290, FXUs 294 and 205 or FPUs 206 and 204, GCT 238 signals the execution unit, which writes back the result data, if any, from the assigned rename register(s) to one or more architected registers within the appropriate register file. The instruction is then removed from the issue queue and once all instructions within its instruction group have been completed, it is removed from GCT 238. Other types of instructions, however, are completed differently.

When BEU 292 resolves a conditional branch instruction and determines the path address of the execution path that should be taken, the path address is compared against the speculative path address predicted by BPU 236. If the path addresses match, no further processing is required. If, however, the calculated path address does not match the predicted path address, BEU 292 supplies the correct path address to IFAR 230. In either event, the branch instruction can then be removed from BIQ 264, and when all other instructions within the same instruction group have completed executing, from GCT 238.

Following execution of a load instruction, the effective address computed by executing the load instruction is translated to a real address by a data ERAT (not illustrated) and then provided to L1 D-cache 220 as a request address. At this point, the load instruction is removed from FXIQ 266 or 268 and placed in load reorder queue (LRQ) 209 until the indicated load is performed. If the request address misses in L1 D-cache 220, the request address is placed in load miss queue (LMQ) 207, from which the requested data is retrieved from L2 cache 216, and failing that, from another core 105 or from system memory. LRQ 209 snoops exclusive access requests (e.g., read-with-intent-to-modify), flushes or kills on interconnect fabric (not shown) against loads in flight, and if a hit occurs, cancels and reissues the load instruction. Store instructions are similarly completed utilizing a store queue (STQ) 210 into which effective addresses for stores are loaded following execution of the store instructions. From STQ 210, data can be loaded into either or both of L1 D-cache 220 and L2 cache 216.

Note that the state of a processor includes stored data, instructions and hardware states at a particular time, and are herein defined as either being "hard" or "soft." The "hard" state is defined as the information within a processor that is architecturally required for a processor to execute a process from its present point in the process. The "soft" state, by contrast, is defined as information within a processor that would improve efficiency of execution of a process, but is not required to achieve an architecturally correct result. In core 105 of FIG. 2, the hard state includes the contents of user-level registers, such as CRR 280, LCR 282, GPRs 284 and 286, FPR 288, as well as supervisor level registers 251. The soft state of core 105 includes both "performance-critical" information, such as the contents of L1 I-cache 218, L1 D-cache 220, address translation information such as DTLB 212 and ITLB 213, and less critical information, such as BHT 235 and all or part of the content of L2 cache 216. Thus, the content of such registers are fixed values that describe a real-time current architecture state register of the processor core 105.

Note that as used to describe core 105 in FIG. 2, L1 denotes lowest level of cache, which is first checked to locate an operator (in the case of an instruction (I) cache) or an operand (in the case of a data (D) cache). If the requisite operand/data is not found within the L1 cache (i.e., a "cache miss"), then the next highest level cache memory (L2 cache) is searched. If there is an L2 cache miss, then the next highest L3 cache (if the system has an L3 level cache) is searched. If there is an L2/L3 cache miss, then system memory is searched for the requisite operand/data. If system memory does not have the needed operand/data (e.g., a page fault), then virtual memory, persistent memory (e.g., a hard drive), and/or a memory cloud (e.g., a network of storage devices) are searched for the needed operand or data.

In one embodiment, if an unauthorized attempt is made to access processor 103 shown in FIG. 1, a core dump from the processor 103 will occur, thus preventing the nefarious attacker from accessing the hard/soft states of processor 103. A core dump includes a recorded state of memory being used by an application at the time of the attack. The core dump includes contents of a program counter, stack pointer, OS flags, etc. In one embodiment, the core dump specifically includes contents of the L1 instruction cache 218, the L1 data cache 220, the L2 cache 216, the CRR 280, LCR 282, GPR 284, and/or FPR 288 depicted and described in FIG. 2. Thus, the content of the core dump contains the "hard" state and/or the "soft" state of the core, as described/defined above.

Figure 3:
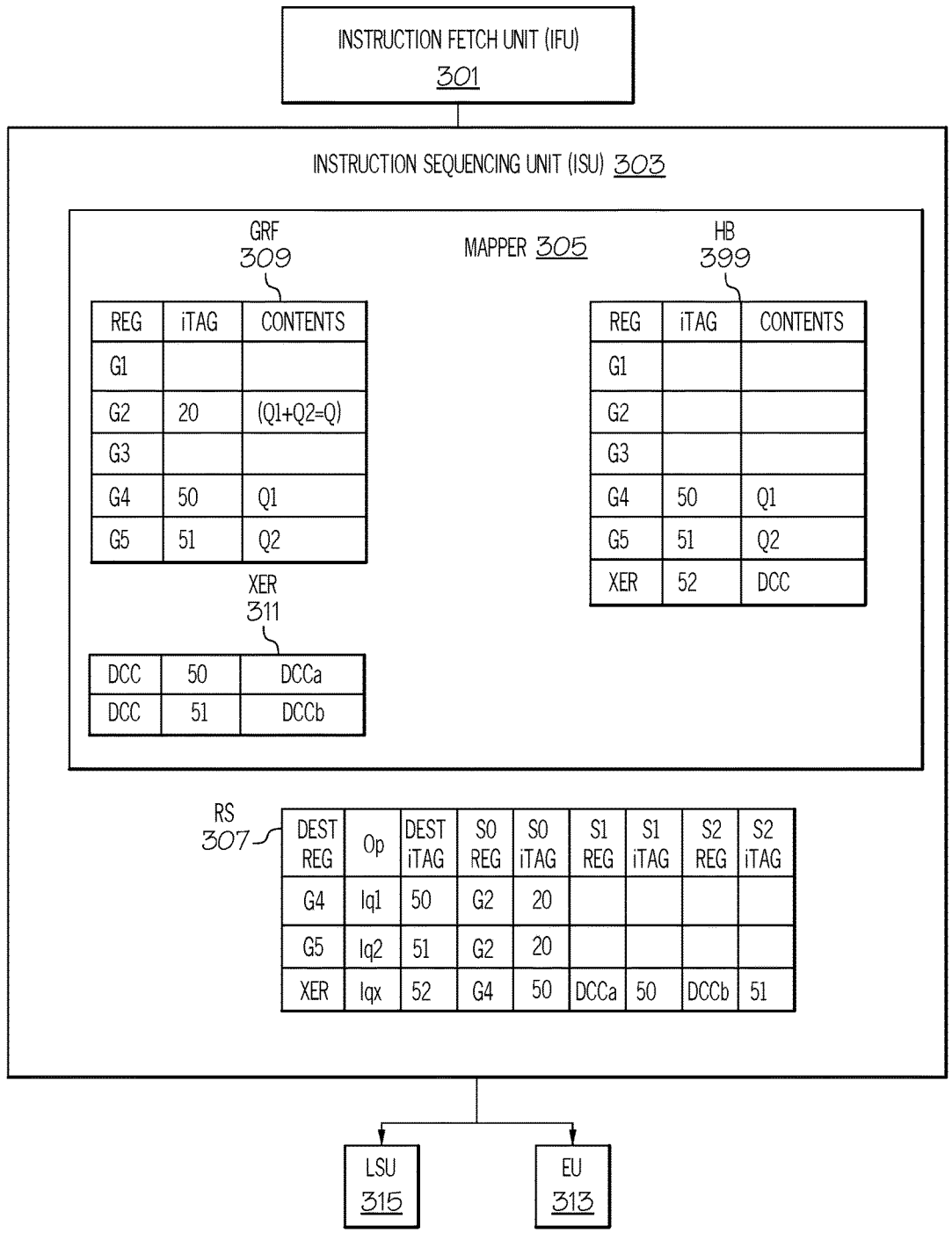
FIG. 3 depicts a simplified version of the processor core shown in FIG. 2 that incorporates novel features of the present invention.

With reference now to FIG. 3, a simplified version of portions of the processor core 105 shown in FIG. 2 is presented showing one or more novel features of the present invention.

An instruction fetch unit (IFU) 301 retrieves instructions to be executed by processor core 105. IFU 301 utilizes one or more of the elements shown in FIG. 2, such as elements 230, 232, and 234.

Once instructions are fetched by IFU 301, they are sequenced by an instruction sequencing unit (ISU) 303, which allows the processor core to execute instructions in sequence and/or out of sequence. ISU 303 includes a mapper 305 and a reservation station (RS) 307. The ISU 303 sends data to a load store unit (LSU) 315, which sends the data to cache, memory, etc. (not shown in FIG. 3) or to an execution unit (e.g., EU 313).

Within mapper 305 is a general register file (GRF) 309, which is made up of multiple physical (hardware) general purpose registers (GPRs). In a preferred embodiment, there are 32 GPRs in GRF 309, although only five GPRs (G1-G5) are depicted for purposes of clarity.

Also part of ISU 303 is a hardware history buffer (HB) 399, which is analogous to HB 299 shown in FIG. 2.

Also part of ISU 303 is an exception register 311, which stores data condition codes (DCCs) about data that is loaded into the GRF 309.

For example, consider the following exemplary pseudocode, in which the following operation occurs:

lq $G4,G5,DCC \leftarrow (G2)$ (Instruction 1)

which is a load quad (lq) instruction to load a quad word (i.e., 4 words, which is the same as 8 bytes, which is the same as 64 bits of data) found at an address shown in GPR 2 ((G2)). Since the GPRs in GRF 309 are only large enough to load 32 bits of data, then the data must be split into two 32-bit units, such that 32 bits are loaded into GPR 4 (G4) and the remaining 32 bits are loaded into GPR 5 (G5). When the two sets of 32 bits are loaded into G4 and G5, data condition codes (DCC) result, and are loaded into the exception register (XER) 311 in a (preferably 3-bit) field identified as DCC, as shown in FIG. 3.

Thus, a 3-way crack of Instruction 1 results in the following three instructions:

50 lq1 $G4,DCCa \leftarrow (G2)$ 51 lq2 $G5,DCCb \leftarrow (G2)$ 52 lqx $DCC \leftarrow DCCa,DCCb$ such that the instruction identified by the instruction tag (iTag) 50 stores the first 32 bits of the quad word (i.e., Q1) into GPR4 (G4), while also storing the resulting intermediate data condition code (DCCa) into the XER 311 in a register labeled DCCa. Similarly, the instruction identified by the iTag 51 stores the last 32 bits of the quad word (i.e., Q2) into GPR5 (G5), while also storing the resulting intermediate data condition code (DCCb) into the XER 311 in a register labeled DCCb.

DCCa and DCCb are intermediate data condition codes for the 32 bits that are being loaded into G4 and G5. For example, when the first 32 bits of quad word Q (i.e., Q1) are loaded into G4, these bits may be less than 32 bits, resulting in an underflow. Similarly, an attempt may have been made to store more than 32 bits into G4, such than an overflow results. Similarly, Q1 may or may not be fully loaded into G4, thus indicating that the load is "in flight" (not complete) or complete (i.e., Q1 is fully loaded into G4). All such conditions are known as data conditions, which are represented by 1-3 bits (data condition codes—DCCs) in the XER 311.

Thus, the intermediate data condition codes DCCa and DCCb are loaded into a register identified as DCC in association with the instructions identified by iTag 50 and iTag 51. That is, as shown in the instruction identified by iTag 52:

52 lqx $DCC \leftarrow DCCa,DCCb$.

However, DCCa and DCCb do not represent "architected" states, meaning that they are not used when tracking instruction operations. Rather, DCCa and DCCb merely represent intermediate data conditions that occurred during the cracking of the original Instruction 1. However, an execution unit (e.g., execution unit (EU) 313) will interpret DCCa and DCCb to generate a final (summed) data condition code DCC, which represents the final state of Q1 after it is loaded into G4 and G5. Thus, this architected state (DCC) is loaded into the HB 399 in the register labeled XER, which also shows the iTag 52 instruction that caused this compilation/combination/summation of DCCa and DCCb.

As shown in history buffer (HB) 399, a record of activities in the GRF 309 is maintained, such that if GRF 309 is flushed (i.e., all contents are erased due to an incorrect prediction of which instructions will be executed next, due to an incorrect prediction of a branch, due to a pause in operations within the processor core, etc.), then HB 399 will have a record of the some of contents of GRF 309 (e.g., what was loaded into G4 and G5), but will not have a record of the intermediate data condition codes DCCa and DCCb. Rather, only the data condition code DCC is loaded into the HB 399.

However, as instructions are executed to cause the GPRs in GRF 309 to store data (and to show the iTags associated with the instructions), a scratch pad of registers is maintained by a reservation station (RS) 307, which is an instruction sequence queue (e.g., one or more of the CRIQ 262, BIQ 264, FXIQs 266 and 268, and FPIQs 270 and 272 shown in FIG. 2). Thus, RS 307 acts both as an instruction sequence queue as well as a scratch pad, such that DCCa and DCCb can be loaded into the XER destination register in the RS 307.

As shown in FIG. 3, RS 307 has enough information to identify, and if necessary to reconstruct, DCCa and DCCb. That is, DCCa is loaded into the source register S1 in RS 307, and also has the source iTag 50, thus identifying the instruction 50 that created DCCa. Similarly, DCCb is loaded into the source register S2 in RS 307, and also has the source iTag 51, thus identifying the instruction 51 that created DCCb.

Therefore, even though HB 399 does not have a record of DCCa and DCCb (since HB 399 only stores architected states, and not intermediate conditions/states), DCCa and DCCb can be retrieved/reconstructed from RS 307 if there is a flushing of GRF 309.

Figure 4:
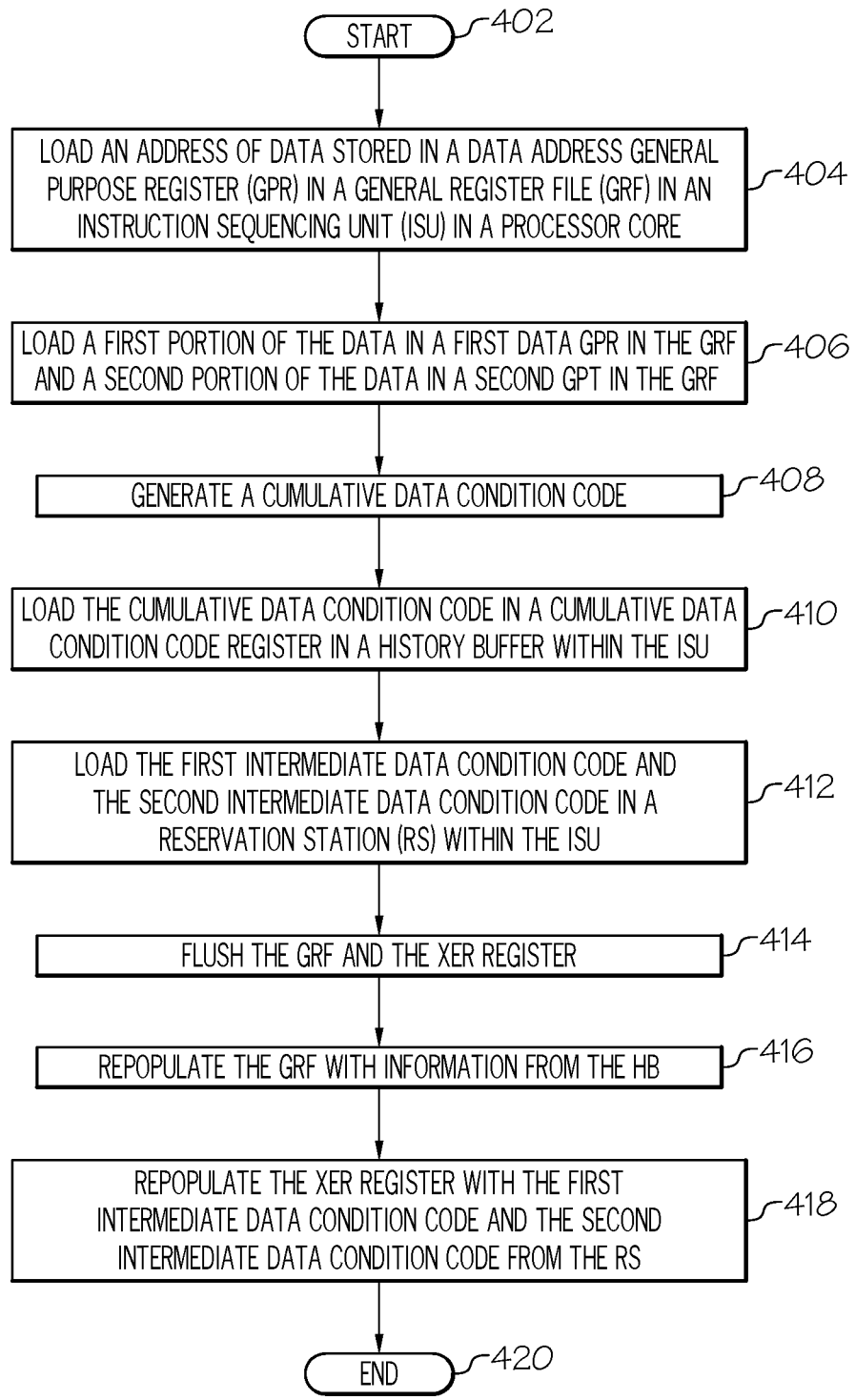
FIG. 4 is a high-level flow chart of exemplary steps taken by hardware devices to utilize a scratch register to store and utilize intermediate data condition codes.

FIG. 4 is a high-level flow chart of exemplary steps taken by hardware devices to utilize a scratch register to store and utilize intermediate data condition codes.

After initiator block 402, one or more execution units within a processor core retrieve an address of data, as described in block 404. As depicted in FIG. 3, the address of the data is loaded in a data address general purpose register (GPR) in a general register file (GRF), and the GRF is in an instruction sequencing unit (ISU) in the processor core. However, the data represented by the address is larger (e.g., 64 bits) than a storage capacity (e.g., 32 bits) of any single GPR in the GRF, and thus two LSU execution slices must occur.

As described in block 406, one or more execution units within the processor core load a first portion of the data (e.g., Q1) in a first data GPR (G4) in the GRF. This loading of Q1 into G4 generates a first intermediate data condition code (e.g., DCCa) that is loaded into an exception register (XER) in the ISU. That is, when the ISU 303 loads Q1 into G4, a condition code DCCa is also created by ISU 303 (i.e., an execution unit within the ISU 303).

As also described in block 406, one or more execution units within the processor core also store a second portion of the data (Q2) in a second data GPR (G5) in the GRF, and storing the second portion of the data in the second data GPR generates a second intermediate data condition code (DCCb) that is loaded into the XER in the ISU.

As described in block 408, one or more execution units within the processor core generate a cumulative data condition code (DCC) based on the first intermediate data condition code (DCCa) and the second intermediate data condition code (DCCb). For example, assume that DCCa represents that there was an overflow when attempting to load Q1 into G4. This overflow condition continues to exist, even if there were an underflow when attempting to load Q2 into G5. Thus, DCC would show a data condition code (DCC) for all of Q as being an overflow. Similarly, if DCCa represents that Q1 was successfully loaded into G4 and DCCb represents that Q2 was successfully loaded into G5, then DCC represents that Q was successfully loaded into G4 and G5.

As described in block 410, the ISU, via a mapper 305 within the ISU, stores the cumulative data condition code in a cumulative data condition code register, which is in a history buffer within the ISU. That is, mapper 305 maps the generated DCC into the XER shown in HB 399 in FIG. 3.

As described in block 412, the ISU loads the first intermediate data condition code and the second intermediate data condition code into a reservation station (RS) within the ISU, where the RS is a hardware instruction sequence queue used by the processor core to dispatch data to various execution units within the processor core (as shown in FIG. 3).

As described in block 414, the ISU flushes the GRF 309 and the exception register 311.

As described in block 416, thereafter the ISU repopulates the GRF with information from the HB. However, since the HB does not contain intermediate data condition codes, the XER is repopulated with the first intermediate data condition code and the second intermediate data condition code from the reservation station (RS 307), as described in block 418.

The flow chart ends at terminator block 420.

As described herein and in an embodiment of the present invention, the first intermediate data condition code (DCCa) describes a first condition of the first portion of the data as it is loaded into the first data GPR, and the second intermediate data condition code (DCCb) describes a second condition of the second portion of the data as it is loaded into the second data GPR.

In an embodiment of the present invention, the ISU blocks any storage of the first intermediate data condition code and the second intermediate data condition code in the history buffer, thus requiring such data to be retrieved/reconstructed from the RS as described herein.

As described herein and in an embodiment of the present invention, the data is a quad word of 64 bits, and wherein the GPRs in the GRF are able to hold only 32 bits.

As described herein and in an embodiment of the present invention, the data is used in a load quad instruction that is executed by the processor core.

Alternatively, the data is used in an add quad instruction (i.e., adding two quad words) that is executed by the processor core. Thus, the loading of the quad words requires four separate loads, two for each of the quad words being summed together.

Alternatively, the data is used in a compare quad instruction (i.e., comparing two quad words) that is executed by the processor core. Thus, the loading of the quad words requires four separate loads, two for each of the quad words being compared to each other.

Note that the flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method comprising:
    retrieving, by one or more execution units within a processor core, an address of data, wherein the address of the data is loaded into a data address general purpose register (GPR) in a general register file (GRF), wherein the GRF is in an instruction sequencing unit (ISU) in the processor core, and wherein the data is larger than a storage capacity of any single GPR in the GRF;
    loading, by one or more execution units within the processor core, a first portion of the data in a first data GPR in the GRF, wherein loading the first portion of the data in the first data GPR generates a first intermediate data condition code that is loaded into an exception register (XER) in the ISU, and wherein the first intermediate data condition code describes a first data condition from a group consisting of an underflow condition, an overflow condition, and an "in flight" condition when loading the first portion of the data into the first data GPR;
    loading, by one or more execution units within the processor core, a second portion of the data in a second data GPR in the GRF, wherein loading the second portion of the data in the second data GPR generates a second intermediate data condition code that is loaded into the XER in the ISU, and wherein the second intermediate data condition code describes a second data condition from the group consisting of the underflow condition, the overflow condition, and the "in flight" condition when loading the second portion of the data into the second data GPR;
    generating, by one or more execution units within the processor core, a cumulative data condition code based on the first intermediate data condition code and the second intermediate data condition code;
    loading, by the ISU and via a mapper within the ISU, the cumulative data condition code into a cumulative data condition code register, wherein the cumulative data condition code register is in a history buffer (HB) within the ISU;
    loading, by the ISU, the first intermediate data condition code and the second intermediate data condition code into a reservation station (RS) within the ISU, wherein the RS is a hardware instruction sequence queue used by the processor core to dispatch data to various execution units within the processor core, and wherein the RS further functions as a scratch pad for storing the first intermediate data condition code and the second intermediate data condition code;
    flushing, by the ISU, the GRF and the XER in order to create a flushed GRF and a flushed XER;
    repopulating, by the ISU, the flushed GRF with information from the HB; and
    repopulating, by the ISU, the flushed XER with the first intermediate data condition code and the second intermediate data condition code from the RS.

2. The method of claim 1, wherein the first intermediate data condition code describes a first condition of the first portion of the data as it is loaded into the first data GPR, and wherein the second intermediate data condition code describes a second condition of the second portion of the data as it is loaded into the second data GPR.

3. The method of claim 1, further comprising:
    blocking, by the ISU, any loading of the first intermediate data condition code and the second intermediate data condition code into the history buffer.

4. The method of claim 1, wherein the data is a quad word of 64 bits, and wherein GPRs in the GRF are able to hold only 32 bits.

5. The method of claim 1, wherein the data is used in a load quad instruction that is executed by the processor core.

6. The method of claim 1, wherein the data is used in an add quad instruction that is executed by the processor core.

7. The method of claim 1, wherein the data is used in a compare quad instruction that is executed by the processor core.

8. The method of claim 1, wherein the first intermediate data condition code describes the underflow condition, wherein the second intermediate data condition code describes the overflow condition, and wherein the method further comprises:
    in response to the first intermediate data condition code describing the underflow condition and the second intermediate data condition code describing the overflow condition, generating, by one or more execution units within the processor core, the cumulative data condition code to represent only the overflow condition to describe a combination of the first intermediate data condition code and the second intermediate data condition code.

9. A computer program product comprising one or more non-transitory computer readable storage mediums, and program instructions loaded on at least one of the one or more non-transitory computer readable storage mediums, the loaded program instructions comprising:
    program instructions to load an address of data, wherein the address of the data is loaded into a data address general purpose register (GPR) in a general register file (GRF), wherein the GRF is in an instruction sequencing unit (ISU) in the processor core, and wherein the data is larger than a storage capacity of any single GPR in the GRF;
    program instructions to load a first portion of the data into a first data GPR in the GRF, wherein loading the first portion of the data into the first data GPR generates a first intermediate data condition code that is loaded into an exception register (XER) in the ISU, and wherein the first intermediate data condition code describes a first data condition from a group consisting of an underflow condition, an overflow condition, and an "in flight" condition when loading the first portion of the data into the first data GPR;
program instructions to load a second portion of the data in a second data GPR in the GRF, wherein loading the second portion of the data in the second data GPR generates a second intermediate data condition code that is loaded into the XER in the ISU, and wherein the second intermediate data condition code describes a second data condition from the group consisting of the underflow condition, the overflow condition, and the "in flight" condition when loading the second portion of the data into the second data GPR;
program instructions to generate a cumulative data condition code based on the first intermediate data condition code and the second intermediate data condition code;
program instructions to load the cumulative data condition code in a cumulative data condition code register, wherein the cumulative data condition code register is in a history buffer (HB) within the ISU;
program instructions to load the first intermediate data condition code and the second intermediate data condition code into a reservation station (RS) within the ISU, wherein the RS is a hardware instruction sequence queue used by the processor core to dispatch data to various execution units within the processor core, and wherein the RS further functions as a scratch pad for storing the first intermediate data condition code and the second intermediate data condition code;
program instructions to flush the GRF and the XER in order to create a flushed GRF and a flushed XER;
program instructions to repopulate the flushed GRF with information from the HB; and
program instructions to repopulate the flushed XER with the first intermediate data condition code and the second intermediate data condition code from the RS.

10. The computer program product of claim 9, wherein the first intermediate data condition code describes a first condition of the first portion of the data as it is loaded into the first data GPR, and wherein the second intermediate data condition code describes a second condition of the second portion of the data as it is loaded into the second data GPR.

11. The computer program product of claim 9, further comprising:
program instructions to block any loading of the first intermediate data condition code and the second intermediate data condition code into the history buffer.

12. The computer program product of claim 9, wherein the data is a quad word of 64 bits, and wherein GPRs in the GRF are able to hold only 32 bits.

13. The computer program product of claim 9, wherein the data is used in a load quad instruction that is executed by the processor core.

14. The computer program product of claim 9, wherein the data is used in an add quad instruction that is executed by the processor core.

15. The computer program product of claim 9, wherein the data is used in a compare quad instruction that is executed by the processor core.

16. A processor core comprising:
one or more hardware execution units; and
an instruction sequencing unit (ISU), wherein the ISU comprises:
a general register file (GRF) composed of multiple hardware general purpose registers (GPRs);
an exception register (XER); and
a reservation station (RS), wherein the RS is an instruction sequence hardware queue used by the processor core to dispatch data to various execution units within the processor core;
wherein:
the one or more execution units within a processor core retrieve an address of data, wherein the address of the data is loaded into a data address general purpose register (GPR) in the general register file (GRF), wherein the GRF is in the instruction sequencing unit (ISU) in the processor core, and wherein the data is larger than a storage capacity of any single GPR in the GRF;
the one or more execution units within the processor core load a first portion of the data into a first data GPR in the GRF, wherein loading the first portion of the data into the first data GPR generates a first intermediate data condition code that is loaded into the exception register (XER) in the ISU, and wherein the first intermediate data condition code describes a first data condition from a group consisting of an underflow condition, an overflow condition, and an "in flight" condition when loading the first portion of the data into the first data GPR;
the one or more execution units within the processor core load a second portion of the data into a second data GPR into the GRF, wherein loading the second portion of the data into the second data GPR generates a second intermediate data condition code that is loaded into the XER in the ISU, and wherein the second intermediate data condition code describes a second data condition from the group consisting of the underflow condition, the overflow condition, and the "in flight" condition when loading the second portion of the data into the second data GPR;
the one or more execution units within the processor core generate a cumulative data condition code based on the first intermediate data condition code and the second intermediate data condition code;
a mapper within the ISU loads the cumulative data condition code into a cumulative data condition code register, wherein the cumulative data condition code register is in a history buffer (HB) within the ISU;
the ISU loads the first intermediate data condition code and the second intermediate data condition code into the reservation station (RS) within the ISU, wherein the RS further functions as a scratch pad for storing the first intermediate data condition code and the second intermediate data condition code;
the ISU flushes the GRF and the XER in order to create a flushed GRF and a flushed XER;
the ISU repopulates the flushed GRF with information from the HB; and
the ISU repopulates the flushed XER with the first intermediate data condition code and the second intermediate data condition code from the RS.

17. The processor core of claim 16, wherein the first intermediate data condition code describes a first condition of the first portion of the data as it is loaded into the first data GPR, and wherein the second intermediate data condition code describes a second condition of the second portion of the data as it is loaded into the second data GPR.

18. The processor core of claim 16, wherein the ISU blocks any loading of the first intermediate data condition code and the second intermediate data condition code in the history buffer.

19. The processor core of claim 16, wherein the data is a quad word of 64 bits, and wherein GPRs in the GRF are able to hold only 32 bits.

20. The processor core of claim 16, wherein the data is used in a load quad instruction that is executed by the processor core.

* * * * *